Figure 1:
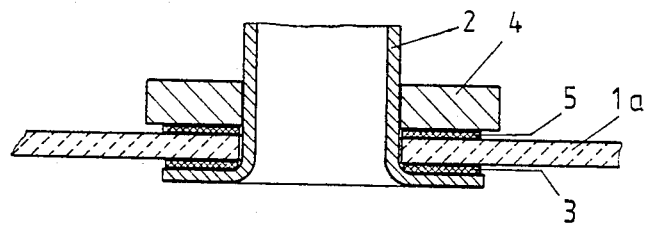

United States Patent [19]

Spet

[11] Patent Number: 4,749,483

[45] Date of Patent: Jun. 7, 1988

[54] MEMBRANE SEPARATION ARRANGEMENT AND METHOD OF PRODUCING A PLATE MODULE THEREOF

[75] Inventor: Gerhard Spet, Vienna, Austria

[73] Assignee: Vogelbusch Gesellschaft m.b.H., Austria

[21] Appl. No.: 72,245

[22] Filed: Jul. 10, 1987

[30] Foreign Application Priority Data

Jul. 22, 1986 [AT] Austria ................. 1978/86

[51] Int. Cl.⁴ .......................... B01D 13/00
[52] U.S. Cl. ................. 210/232; 210/321.84; 210/346
[58] Field of Search .......... 210/321.75, 321.84, 210/232, 433.2, 346

[56] References Cited

U.S. PATENT DOCUMENTS 3,332,216  7/1967  Stern ..................... 55/158
4,228,015  10/1980  De Vries et al. ........ 210/321.75

Primary Examiner—Frank Spear
Attorney, Agent, or Firm—Ostrolenk, Faber, Gerb & Soffen

[57] ABSTRACT

A membrane separation arrangement includes a plurality of plate modules adjacently arranged in a housing, the plate modules being formed by two separation membranes each, which are interconnected at their rim regions so as to be tight all around, inner spacers formed by a layer of fibrous material being provided between said separation membranes.

To reliably obtain tightness of the individual plate modules, with no high forces required for tightness acting on the separation membranes, while allowing the separation membranes to move without becoming damaged, outer spacers contacting the separation membranes and formed by a layer of fibrous material, such as a woven fabric, a knitted fabric or a nonwoven fabric, of organic or inorganic fibres, are provided between the individual plate modules, and the individual plate modules are interconnected via connection pieces sealingly inserted in openings of the separation membranes.

12 Claims, 1 Drawing Sheet

MEMBRANE SEPARATION ARRANGEMENT AND METHOD OF PRODUCING A PLATE MODULE THEREOF

The invention relates to a membrane separation arrangement including a plurality of plate modules adjacently arranged in a housing, wherein the plate modules each have two separation membranes interconnected at their rim regions so as to be tight all around, inner spacers being provided therebetween formed by a layer of fibrous material, as well as to a method of producing a plate module of such a membrane separation arrangement.

An arrangement of this kind is known from U.S. Pat. No. 3,332,216. Such separation membranes assembled to plate packs serve for carrying out membrane separation methods, such as reverse osmosis, ultrafiltration or microfiltration, gas separation and pervaporation, wherein multi-component media to be separated, such as liquids, solutions or vapours, are guided under pressure past a separating membrane.

While the multi-component media pass by a separation membrane, certain components thereof preferredly pass through the membrane as the so-called permeate.

In many cases, the separation membranes consist substantially of a thin, comparatively permeable carrier foil, at one side of which the active coating is applied (so-called asymmetrical separation membrane). There are, however, also separation membranes that consist exclusively of the active layer itself. In addition thereto, so-called symmetrical separation membranes are obtainable, which have an active coating on both sides of a carrier foil. As the active coating, a large number of polymers, such as cellulose derivatives, for instance cellulose acetate, the most varying polyamides, polysulphones and also inorganic materials, such as graphite oxide and zirconium hydroxide, are known. In separation membranes having a carrier foil, the active coating generally has a thickness of several $10^{-3}$ to $10^{-1}$ mm.

When assembling a plate pack, according to U.S. Pat. No. 3,332,216, a separation membrane each is laid upon a carrier provided with openings—a grid or a perforated sheet or plate—with a damping layer interposed. Sealing of the individual plate modules thus formed is effected by tightly connecting the rim regions of the separation membranes.

Assembling a plurality of plate modules into a pack constitutes a problem, because a tight connection of the inner spaces of the plate modules and their connection to a supply conduit, via which the media are supplied, must be provided for, which connection must be easy on the separation membranes. For this purpose it is known from U.S. Pat. No. 3,332,216 to press the superposed plate modules directly and tightly against each other and to provide this stack with through-going openings, via which the media are supplied and drained. This involves the disadvantage that the separation membranes, which directly contact each other at the pressing sites, are subjected to high mechanical stresses, in particular in the area neighbouring the pressing sites. When the separation membranes move, the latter may become damaged, and thus the tightness of the pack is no longer ensured.

The invention aims at avoiding these disadvantages and difficulties and has as its object to provide a membrane separation arrangement of the initially defined kind, in which the individual plate modules are reliably tightly interconnected, wherein, however, no high forces required for tightness act on the separation membranes and wherein it becomes possible for the separation membranes to move without being damaged.

According to the invention, this object is achieved in that outer spacers contacting the separation membranes are provided between the individual plate modules, which outer spacers are formed by a layer of fibrous material, such as a woven fabric, a knitted fabric or a nonwoven fabric, of organic or inorganic fibres, and that the individual plate modules are interconnected via connection pieces sealingly inserted in openings of the separation membranes.

Due to the connection pieces sealingly inserted in the openings of the separation membranes, pressing together of the separation membranes is no longer required, and it becomes possible to provide spacers of fibrous material between the individual plate modules, which spacers allow for movements of the separation membranes without the separation membranes becoming damaged.

It is known per se to provide openings in membrane surfaces of a plate module and to sealingly insert connection pieces into these openings for supply and drain (No. WO-A-82/00102). In this case one plate module each is inserted in a rigid housing. This construction requires much space and is very heavy. Furthermore, the rigid housing involves the danger of a damage to the membranes.

If asymmetrical separation membranes are used in an arrangement according to the invention, the active coatings of the membranes in the interior of the plate module face each other.

As the fibrous material for an inner spacer, all common woven fabrics, knitted fabrics or nonwoven fabrics may be used, which can endure the media passed through. Particularly suitably, a layer of glass fibre fabric may be provided.

Advantageously, tubelets having one flanged-up end are used as the connection pieces, wherein the flanged-up end is connected with the inner side of a separation membrane by a layer of glue, and a counter-holder fitting to the tubelet is connected to the outer side of the separation membrane by a further layer of glue.

In this manner, a stable fastening of the connection pieces is ensured without the danger of damaging the separation membranes. As the counter-holder for a tubelet having a circular cross-section, a disk having a somewhat larger inner diameter than the outer diameter of the tubelet may be used.

As glues, all products compatible with the materials used may be utilized. Cold-setting single or multi-component glues as well as glues that have to be processed in the hot state may be used. In many cases, the use of little foil disks coated at both sides with glue is advantageous for this purpose.

According to a further preferred embodiment, tubelets used as connection pieces are provided with an outer thread, and as the counter-holder a nut is screwed on with a washer therebetween.

Both the connection pieces or tubelets and the counter-holders or nuts may be made of metal—stainless steel or aluminum, e.g.—or of a suitable synthetic material, because the carrier membranes are embedded in fibrous material at both sides, so that damage thereto need not be feared inspite of the rigid connection pieces.

If tubelets counter-screwed from the outer side of the plate module are provided as the connection pieces, it is possible to insert little sealing disks between the flanged-up end of a tubelet and the inner side of the separation membrane as well as between the washer and the outer side of the separation membrane instead of the glue layers.

The connection pieces may be sealingly welded together or glued together. If tubelets having an outer thread are used, tight screw connections of the most varying kinds may be made. It is also possible to slip hose pieces of an elastic material over the connection pieces for making a connection.

Preferably, as the outer spacer a layer built up of glass fibres, metal fibres or synthetic fibres is provided.

A method according to the invention for producing a plate module is characterised in that openings are produced in the separation membrane surfaces, into which openings connection pieces are sealingly inserted by gluing and/or screwing them to both sides of the separation membrane, subsequently superposing two separation membranes in such a manner that the connection pieces project outwardly, whereupon the rim regions of the two separation membranes are connected with each other so as to be tight all around, wherein a layer of fibrous material is introduced between the two separation membranes within the rim regions connected to each other.

Therein, the openings in the separation membranes may be produced within the least possible amount of time, e.g. by punching. On each of the two membrane surfaces, one or several openings of any desired contour shape may be provided, it being favorable for reasons of passage, if the openings in one membrane surface are arranged so as to be offset relative to the openings in the second membrane surface.

A tight rim connection may particularly be achieved in that at first the two superposed separation membranes—under insertion of a layer of fibrous material between the separation membranes—are glued to each other at their rim regions, subsequently the glued rims are flanged inward under insertion of a glue layer relative to one of the two separation membranes, and the flange ledge thus formed, under insertion of a second layer of glue, is flanged-in a second time relative to the separation membrane. The twice flanged-in rims finally may be pressed together or rolled together, heat also possibly being applied, depending on the type of glue used.

The gluings may be made with a cold-setting glue, such as a silicon glue, or with a glue that is to be processed in the hot state, such as a melting glue or a heat sealing glue.

The housing of the membrane separation arrangement is of a very simple construction and is only necessary for laterally supporting the stack of adjacently arranged plate modules according to the invention, it may be made of metal or of a synthetic material.

A membrane separation arrangement according to the invention can be assembled very quickly, is of great operational safety and easy to handle, with the most simple construction it obtains the highest flow rates without the occurrence of any problems of tightness.

Figure 2:
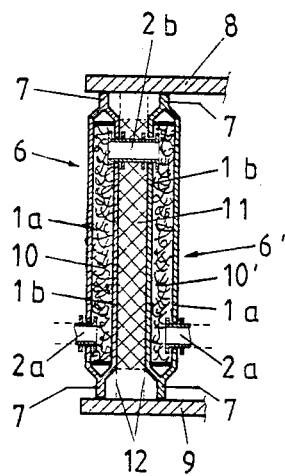
Figure 3:
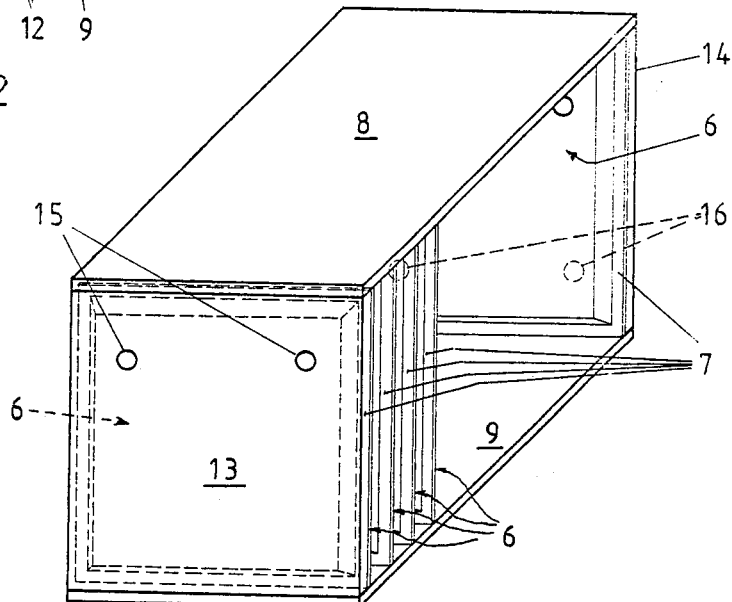

The invention will now be explained in more detail in the drawings, wherein:

FIG. 1 schematically illustrates a section through one embodiment of a connection site between a connection piece and a separation membrane;

FIG. 2 also schematically illustrates sections through two identical plate modules according to the invention, which are connected with each other via their connection pieces and which are adjacently arranged in a housing; and FIG. 3 finally shows a greatly simplified view of one example of a membrane separation arrangement according to the invention.

According to FIG. 1, a connection piece in form of a tubelet 2 with a flanged-up end at one side is inserted into an opening of a separation membrane 1a. The flanged-up end is connected with the inner side of the separation membrane 1a by a circular-ring shaped glue layer 3, and a disk 4 fitting over the tubelet 2 as counterholder is connected with the outer side of the separation membrane 1a by a further glue layer 5.

In FIG. 2, plate modules are generally denoted by 6 and 6'. Each of them consists of two superposed, approximately square separation membranes 1a and 1b, which are connected with each other at their rim regions 7 so as to be tight all around. In the embodiment illustrated, two connection pieces 2a and 2b are sealingly inserted in respective openings on each membrane surface of a plate module 6 and 6', respectively, the openings in each membrane surface being arranged parallel to oppositely arranged edges of the plate modules 6 and 6', respectively. The connection pieces 2a in the separation membrane 1a, furthermore, are each arranged so as to be offset relative to the connection pieces 2b in the separation membrane 1b. For enabling a sealing connection of the plate modules via the connection pieces, identical plate modules of the embodiment described following upon each other, need only be inserted turnedly in a housing, which is indicated in FIG. 2 by the walls 8 and 9. This has extraordinary advantages in the mass production and in the assembly of the 5 plate modules, because all the modules can be identically made. Similar advantages may, of course, also be obtained with rectangular plate modules, e.g., if they are shaped correspondingly.

Between the separation membranes 1a and 1b, inner spacers 10, 10' of permeable material are each provided. Also between the plate modules 6, 6' a spacer 11 of permeable material is arranged, which simultaneously has a supporting function and has recesses for the connection pieces 2b that are tightly interconnected. In addition, also supporting grids 12 indicated in broken lines can be seen in the embodiment illustrated between the plate modules 6, 6' and the spacer 11.

The upper cover of the housing is denoted by 8 also in FIG. 3, and the lower cover by 9. A plurality of plate modules 6 is adjacently arranged between two end walls 13, 14. The interconnection of the individual plate modules 6 via their connection pieces is made in the manner explained in connection with FIG. 2 and is not illustrated.

Media are supplied via connections 15 in the end wall 13 and drained via connections 16 in the end wall 14. The media flow through all the plate modules 6 in a substantially zig-zag-like path, the permeate passing through the separation membranes and being collected.

What I claimed is:
1. In a membrane separation arrangement of the type including
   a housing,
   a plurality of plate modules adjacently arranged in said housing, each plate module including two separation membranes whose rim regions are interconnected to as to be tight all around, inner spacers provided between said separation membranes and each formed of a layer of fibrous material, the improvement which is characterized in that outer spacers are provided between the individual plate modules, contacting said separation membranes and each formed of a layer of fibrous material, said separation membranes include openings, and connection pieces are sealingly inserted in said openings of said separation membranes so as to interconnect said individual plate modules.

2. A membrane separation arrangement as set forth in claim 1, wherein said layer of fibrous material of said outer spacer is a woven fabric.

3. A membrane separation arrangement as set forth in claim 1, wherein said layer of fibrous material of said outer spacer is a knitted fabric.

4. A membrane separation arrangement as set forth in claim 1, wherein said layer of fibrous material of said outer spacer is a nonwoven fabric.

5. A membrane separation arrangement as set forth in claim 1, wherein said layer of fibrous material of said outer spacer is made of organic fibres.

6. A membrane separation arrangement as set forth in claim 1, wherein said layer of fibrous material of said outer spacer is made of inorganic fibres.

7. A membrane separation arrangement as set forth in claim 1, wherein each separation membrane has an inner side and an outer side, and wherein said connection pieces are tubelets having one end flanged-up, said flanged-up end being connected with said inner side of a separation membrane by a glue layer, further comprising a counterholder fitting over said tubelet and connected with said outer side of said pertaining separation membrane via a further glue layer.

8. A membrane separation arrangement as set forth in claim 7, wherein said tubelets have an outer thread and wherein said counter-holder is formed by a nut screwed thereon, a washer being interposed therebetween.

9. A membrane separation arrangement as set forth in claim 1, wherein said outer spacers each are comprised of a layer of glass fibres.

10. A membrane separation arrangement as set forth in claim 1, wherein said outer spacers each are comprised of a layer of metal fibres.

11. A membrane separation arrangement as set forth in claim 1, wherein said outer spacers each are comprised of a layer of synthetic fibres.

12. A method of producing a plate module of a membrane separation arrangement including a housing, a plurality of plate modules adjacently arranged in said housing, each plate module including two separation membranes having membrane surfaces and rim regions, inner spacers of fibrous material provided between said separation membranes, and outer spacers of fibrous material provided between individual plate modules and contacting said separation membranes, said method comprising the steps of making openings in said separation membrane surfaces, sealingly inserting connection pieces into said openings by at least one of gluing and screwing to both sides of a separation membrane, subsequently superposing two separation membranes such that said connection pieces project outwardly, thereupon interconnecting said rim regions of said two separation membranes so as to be tight all around, and inserting a layer of fibrous material between said two separation membranes within said rim regions to act as said inner spacers.

* * * * *